US011260274B1

(12) United States Patent
Krogue et al.

(10) Patent No.: US 11,260,274 B1
(45) Date of Patent: Mar. 1, 2022

(54) ENRICHMENT DEVICE

(71) Applicants: Christine Krogue, Kaysville, UT (US); John Krogue, Kaysville, UT (US)

(72) Inventors: Christine Krogue, Kaysville, UT (US); John Krogue, Kaysville, UT (US)

( * ) Notice: Subject to any disclaimer, the term of this patent is extended or adjusted under 35 U.S.C. 154(b) by 0 days.

(21) Appl. No.: 17/231,440

(22) Filed: Apr. 15, 2021

(51) Int. Cl.
*A63B 47/00* (2006.01)
*F16B 47/00* (2006.01)
*A63F 7/02* (2006.01)
*A63F 7/36* (2006.01)
*A63F 5/02* (2006.01)
*A63F 7/34* (2006.01)

(52) U.S. Cl.
CPC .............. *A63B 47/002* (2013.01); *A63F 7/02* (2013.01); *A63F 7/3622* (2013.01); *F16B 47/00* (2013.01); *A63F 5/02* (2013.01); *A63F 2007/345* (2013.01)

(58) Field of Classification Search
CPC ....... A63B 47/002; A63B 47/00; A63B 69/40; A63B 2069/401; A63B 71/00; F16B 47/00; A47F 5/0006; A63F 5/02; A63F 5/0088; A63F 7/02; A63F 7/04; A63F 2007/341; A63F 2007/345; A63F 7/3622
See application file for complete search history.

(56) References Cited

U.S. PATENT DOCUMENTS

| | | | | | |
|---|---|---|---|---|---|
| 613,414 | A | * | 11/1898 | Harrison et al. ......... | A63F 5/02 273/138.4 |
| 3,350,097 | A | * | 10/1967 | Chevrette .............. | A63B 63/08 273/350 |
| 4,425,771 | A | * | 1/1984 | Beach ................. | E05B 47/0038 292/251.5 |
| 5,667,082 | A | * | 9/1997 | Hamilton .............. | A63B 47/00 211/15 |
| 5,673,812 | A | * | 10/1997 | Nelson ................ | A63B 47/002 221/265 |

(Continued)

FOREIGN PATENT DOCUMENTS

EM 008098362-0001 10/2020

OTHER PUBLICATIONS https://www.amazon.com/Playkidz-Super-Durable-Pound-Toddlers/dp/B01N1FCSBQ/ref-sr_1_3?dchild=1&keywords=ball+ramp+toys&qid=1618347048&sr=8-3.

(Continued)

*Primary Examiner* — Ko H Chan
(74) *Attorney, Agent, or Firm* — Wilson Dutra, PLLC; Camille A. Wilson

(57) ABSTRACT

The present disclosure provides for an enrichment device. The enrichment device may comprise a body, a cap, a retaining mechanism, a release mechanism, an attachment mechanism. The body may comprise a hollow cavity within the enrichment device that may allow for objects to pass through the body. The release mechanism may comprise an external attached device. In some embodiments, the release mechanism may operate electronically. The attachment mechanism may allow a plurality of orientations of the enrichment device. The body may comprise external tracks that may allow for one or more attachment locations via the attachment mechanism. The release mechanism may exert a passive retention force that may be overcome through a sufficient volume of material applying force on the retaining mechanism from within the enrichment device. In some implementations, one or more enrichment devices may be used in unison.

18 Claims, 11 Drawing Sheets

(56) References Cited

U.S. PATENT DOCUMENTS

| | | | |
|---|---|---|---|
| 5,810,681 A * | 9/1998 | Heim | A63B 47/02 |
| | | | 221/199 |
| D476,451 S | 6/2003 | Morgan, Sr. | |
| 7,244,198 B2 * | 7/2007 | Morshed | A63B 47/002 |
| | | | 473/459 |
| D559,470 S | 1/2008 | Stevens et al. | |
| 7,500,927 B2 * | 3/2009 | Morshed | A63B 47/002 |
| | | | 473/459 |
| 7,686,186 B2 * | 3/2010 | Smith | A63B 55/408 |
| | | | 221/309 |
| 8,262,517 B2 * | 9/2012 | Balasubramanyan | |
| | | | A63B 69/385 |
| | | | 473/459 |
| D704,384 S | 5/2014 | Worsley et al. | |
| 9,517,390 B1 * | 12/2016 | Duffy | A63B 71/0045 |
| 2010/0018936 A1 * | 1/2010 | Di Donato | A63B 47/002 |
| | | | 211/8 |
| 2020/0054954 A1 * | 2/2020 | Forgrave | A63H 33/08 |

OTHER PUBLICATIONS https://www.amazon.com/B-Toys-Lb-Ball-Learning/dp/B0080AHGZY/ref-sr_1_18?dchild=1&keywords=ball+ramp+toys&qid=16183470858sr=8-18.

https://www.amazon.com/Battat-Activity-Station-Hammer-Months/dp/B01N9UXQ2P/ref-sr_1_24?dchild=1&keywords=ball+ramp+toys&qid=16183470858sr=8-24.

https://www.amazon.com/Playskool-Explore-Popper-Amazon-Exclusive/dp/B00U5U5VWM/ref-sr_1_28?dchild=1&keywords=ball+ramp+toys&qid=16183470858sr=8-28.

https://www.amazon.com/Toomies-Cannon-Ball-Pic-Pop/dp/B002NWJ1LW/ref-sr_1_11?dchild=1&keywords=ball+toddler+toys&qid=1618347161&sr=8-11.

* cited by examiner

ENRICHMENT DEVICE

BACKGROUND

Child development is shaped by a multitude of factors that vary between nature and nurture, ranging from what a child is born with, their inherited traits and abilities, what a child experiences, the care they receive, and the relationships they develop with other people. To help drive child development, enrichment activities are used to promote critical thinking, listening, memorization, visualization, and concentration. As a result, exposure to enrichment tools and activities may improve a child's life in significant ways. When compared to children who do not have access to enrichment programs, children who do partake in enrichment programs perform better in school, improve motor skills faster than other children, and show increased social skills. Additionally, enrichment activities allow a child to express themselves more easily and to show greater displays of creativity. Enrichment activities outside of the classroom typically include things like after-school clubs, music lessons, performing in dramatic arts, and supporting the local community through volunteer events.

Parents, teachers, or caretakers may use enrichment tools or activities to discover and develop a child's interests. For example, a child drawn to a device with gears, motors, levers, or other mechanisms, may develop a passion for physics or engineering. Another child who finds itself playing with a piano could find a love for music or math. Enrichment activities with interactive or interchangeable parts may foster a greater capacity for problem solving, learning, or critical thinking, specifically one that provides a tangible experience to add to the understanding of different mechanisms.

Often, another benefit of enrichment activities is to keep the child constructively busy. Without alluring distractions, a child may act out destructively or aimlessly. Playing with an enrichment device may grow a child's passion for the arts or sciences. Enrichment devices may foster a sense of independence, otherwise the child may become dependent on others for entertainment. However, sometimes there is a gap between the enrichment activity and the child's age. For example, a newborn would not be able to play a sport like soccer. This underscores the importance of having differing enrichment activities that span a wide range of ability levels for each child.

SUMMARY OF THE DISCLOSURE

What is needed is an enrichment device that may facilitate interactive learning through tactile engagement. In some embodiments, the enrichment device may comprise a body, a cap, a retaining mechanism, a release mechanism, an attachment mechanism. In some implementations, the body may comprise a hollow cavity within the enrichment device that may allow for objects to pass through the body. In some aspects, the release mechanism may comprise an external attached device. In some embodiments, the release mechanism may operate electronically. In some implementations, the attachment mechanism may allow a plurality of orientations of the enrichment device.

In some aspects, the body may comprise external tracks that may allow for one or more attachment locations via the attachment mechanism. In some embodiments, the release mechanism may exert a passive retention force that may be overcome through a sufficient volume of material applying force on the retaining mechanism from within the enrichment device. In some implementations, one or more enrichment devices may be used in unison. In some aspects, the body of the enrichment device may provide for the insertion of interactive objects that may be released via the release mechanism.

The present disclosure relates to an enrichment device. In some embodiments, an enrichment device may comprise a body that may comprise a receiving opening and an exit opening. In some implementations, an enrichment device may include a receiving opening that may be configured to receive an inserted ball and the exit opening may be configured to dispense an inserted ball. In some aspects, an enrichment device may include a body cavity connecting the receiving opening and the exit opening, where the inserted ball travels from the receiving opening to the exit opening through the body cavity. In some embodiments, the enrichment device may comprise a retaining mechanism configured to fit over at least a portion of the exit opening; a release mechanism configured to control a position of the retaining mechanism; and an attachment mechanism configured to attach the body to a wall or fixture.

In some embodiments, an attachment mechanism may comprise suction cups. In some implementations, the retaining mechanism may be securable through a magnetic mechanism, where pressing the release mechanism releases the magnetic mechanism. In some aspects, the enrichment device may comprise at least a first cap attachable to the receiving opening. In some embodiments, the cap may comprise a cup with handle. In some implementations, the cap may comprise a secondary receiving opening, where the inserted ball travels through the secondary receiving opening into the receiving opening.

In some embodiments, the release mechanism may be rotatable. In some implementations, the attachment mechanism may be adjustable. In some aspects, the attachment mechanism may be configured to slide along the attachment mechanism track. In some embodiments, the body may comprise at least one sensory device. In some implementations, at least one sensory device may comprise motion-activated lights, where motion-activated lights activate as an inserted ball travels through the body cavity. In some aspects, at least one sensory device may comprise haptic feedback configured to activate as an inserted ball travels through the body cavity.

The present disclosure relates to an enrichment device with a plurality of bodies, where each may comprise a receiving opening; an exit opening, where receiving opening may be configured to receive an inserted ball and the exit opening may be configured to dispense the inserted ball; a body cavity connecting the receiving opening and the exit opening, where the ball travels from the receiving opening to the exit opening through the body cavity. In some embodiments, the enrichment device may comprise at least one retaining mechanism configured to fit over at least a portion of at least one exit opening; at least one release mechanism configured to control a position of the at least one retaining mechanism, and at least one attachment mechanism configured to attach the plurality of bodies to a wall or fixture.

In some embodiments, the plurality of bodies may be connected. In some implementations, the body cavity of each of the plurality of bodies may be parallel. In some aspects, the plurality of bodies may be connectable. In some embodiments, each cap may cover each receiving opening.

In some embodiments, the enrichment device may comprise a body may comprise a first receiving opening; a plurality of exit openings, where the first receiving opening may be configured to accept an inserted ball and the plurality of exit openings are configured to dispense the inserted ball; and a body cavity connecting the first receiving opening and the plurality of exit openings, where the inserted ball travels from the receiving opening to the exit opening through the body cavity. In some implementations, the enrichment device may comprise a retaining mechanism configured to fit over at least a portion of the plurality of exit openings; a release mechanism configured to control a position of the retaining mechanism, where the position of the retaining mechanism controls dispensing of the inserted ball; and an attachment mechanism attachable to the body, where the attachment mechanism may be configured to attach the body to a wall or fixture.

In some embodiments, the enrichment device may comprise a cap attachable to the first receiving opening, where the cap covers at least a portion of the first receiving opening when in a closed position. In some implementations, the body cavity may provide a plurality of paths from the first receiving opening to the plurality of exit openings.

BRIEF DESCRIPTION OF THE DRAWINGS

The accompanying drawings that are incorporated in and constitute a part of this specification illustrate several embodiments of the disclosure and, together with the description, serve to explain the principles of the disclosure.

DETAILED DESCRIPTION

In the following sections, detailed descriptions of examples and methods of the disclosure will be given. The description of both preferred and alternative examples, though thorough, are exemplary only, and it is understood to those skilled in the art that variations, modifications, and alterations may be apparent. It is therefore to be understood that the examples do not limit the broadness of the aspects of the underlying disclosure as defined by the claims.

Figure 1:
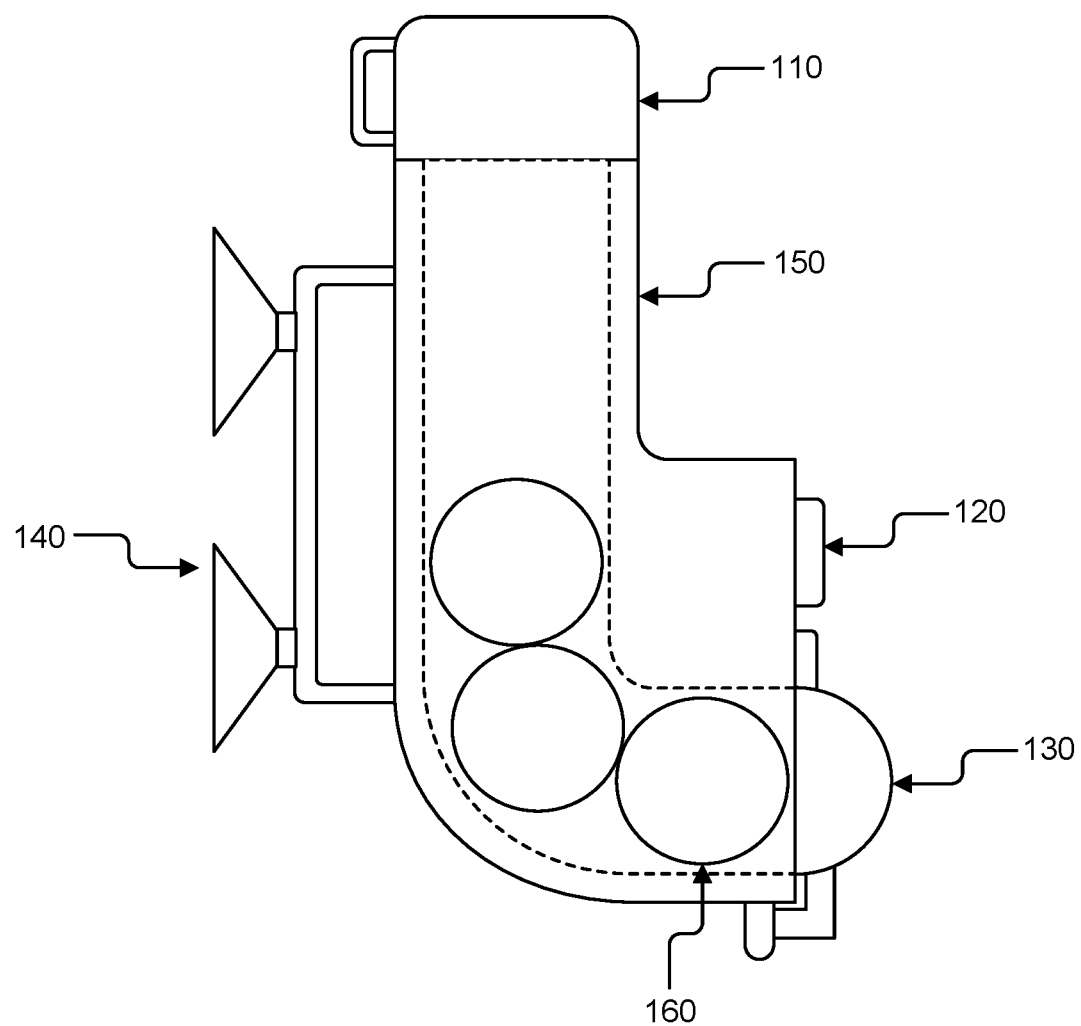
FIG. 1 illustrates an exemplary enrichment device, according to some embodiments of the present disclosure.

Referring now to FIG. 1, an exemplary enrichment device 100 is illustrated. In some embodiments, the enrichment device 100 may comprise a cap 110 attachable to a receiving opening and a retaining mechanism 130 at an exit opening. In some aspects, the cap 110 may control access to the receiving opening.

In some embodiments, a retaining mechanism 130 may operate magnetically and require the overcoming of a force threshold to release the retaining mechanism 130. In some implementations, the enrichment device may be attached to a wall of a bathtub and require the addition of water, in addition to the balls 160, to overcome the force threshold of the retaining mechanism 130. In some aspects, the cap 110 may be sufficiently hollow to fill with water that may be dumped into the body 150 of the enrichment device 100.

In some embodiments, water may pour into the bathtub as the release mechanism 120 is depressed and decouples the magnetic hold of the retaining mechanism 130. In some implementations, the cap 110 may assist in securing the balls 160 within the body 150 of the enrichment device 100 when the enrichment device 100 is not actively being used.

In some aspects, the enrichment device 100 may be filled with one or more materials. For example, a toddler may play with the enrichment device 100 in a sandpit. The toddler may use the cap 110 to fill the body 150 with sand. The balls 160 may be present within the body 150. The toddler may add water to the sand so that the body 150 may comprise sand, water, and the balls. In some embodiments, the curvature of the tubing within the body 150 may be comprise an angle of curvature sufficient to allow dense material to exit the body 150 upon release of the retaining mechanism 130.

In some implementations, the enrichment device 100 may comprise a body 150. In some aspects, the enrichment device 100 may comprise a release mechanism 120. In some implementations, the release mechanism 120 may function as a mechanical release mechanism 120. In some aspects, the release mechanism 120 may comprise electrical components. For example, the release mechanism 120 may comprise a sensor that detects proximity to the enrichment device 100. In some implementations, the release mechanism 120 may send an electrical signal to the retaining mechanism 130 that may disengage the securing latch.

In some embodiments, the enrichment device 100 may comprise one or more balls 160. In some aspects, the balls 160 may comprise sufficient buoyancy to allow for flotation.

In some implementations, the balls 160 may comprise sufficient density to allow for submersion. In some aspects, the balls 160 may comprise a range of colors and materials, as non-limiting examples. For example, one ball 160 may be red, another transparent, another may comprise foam while the other two may comprise a plastic. Variations with the balls 160 may allow for understanding of how different properties relate to scientific principles, such as buoyancy.

In some embodiments, the balls 160 may comprise subcomponents. For example, the balls 160 may comprise an internal signal emitter that may interface with the enrichment device 100 as the ball 160 passes through the body 150. In some implementations, the interaction between the body 150 and the balls 160 may trigger a sensory device within the enrichment device. As an example, the ball 160 may cause a sound to emit every time the ball 160 enters the body 150 and exits the body 150.

In some implementations, the enrichment device 100 may comprise an attachment mechanism 140. In some embodiments, the enrichment device 100 may comprise an attachment mechanism 140 on either side of the body 150 or the rear of the body 150, as a non-limiting list of alternatives. In some implementations, the attachment mechanism 140 may allow for vertical or horizontal orientation of the enrichment device 100. As non-limiting examples, the attachment mechanism 140 may comprise suction cups, adhesive strips, magnetic strips, or hook and loop material. In some embodiments, the attachment mechanism 140 may comprise multiple parts that may require a surface portion to attach to a surface and then a device on the enrichment device 100 that may attach to the surface portion.

In some aspects, the enrichment device 100 may comprise a retaining mechanism 130. In some embodiments, the retaining mechanism 130 may comprise mechanical subcomponents. For example, the retaining mechanism 130 may comprise a torsional spring that keeps a hook latch in place until the release mechanism 120 facilitates the separation of the latch.

In some implementations, the retaining mechanism 130 may comprise magnetic components that are deactivated upon separation by the release mechanism 120 that comprises a lever. In some aspects, the retaining mechanism 130 may comprise electrical components. For example, an electromagnet may receive a charge from an internal battery that maintains the closed position of the retaining mechanism 130. Upon depression of the release mechanism 120, the electromagnet may deactivate and allow the retaining mechanism 130 to open.

Figure 2A:
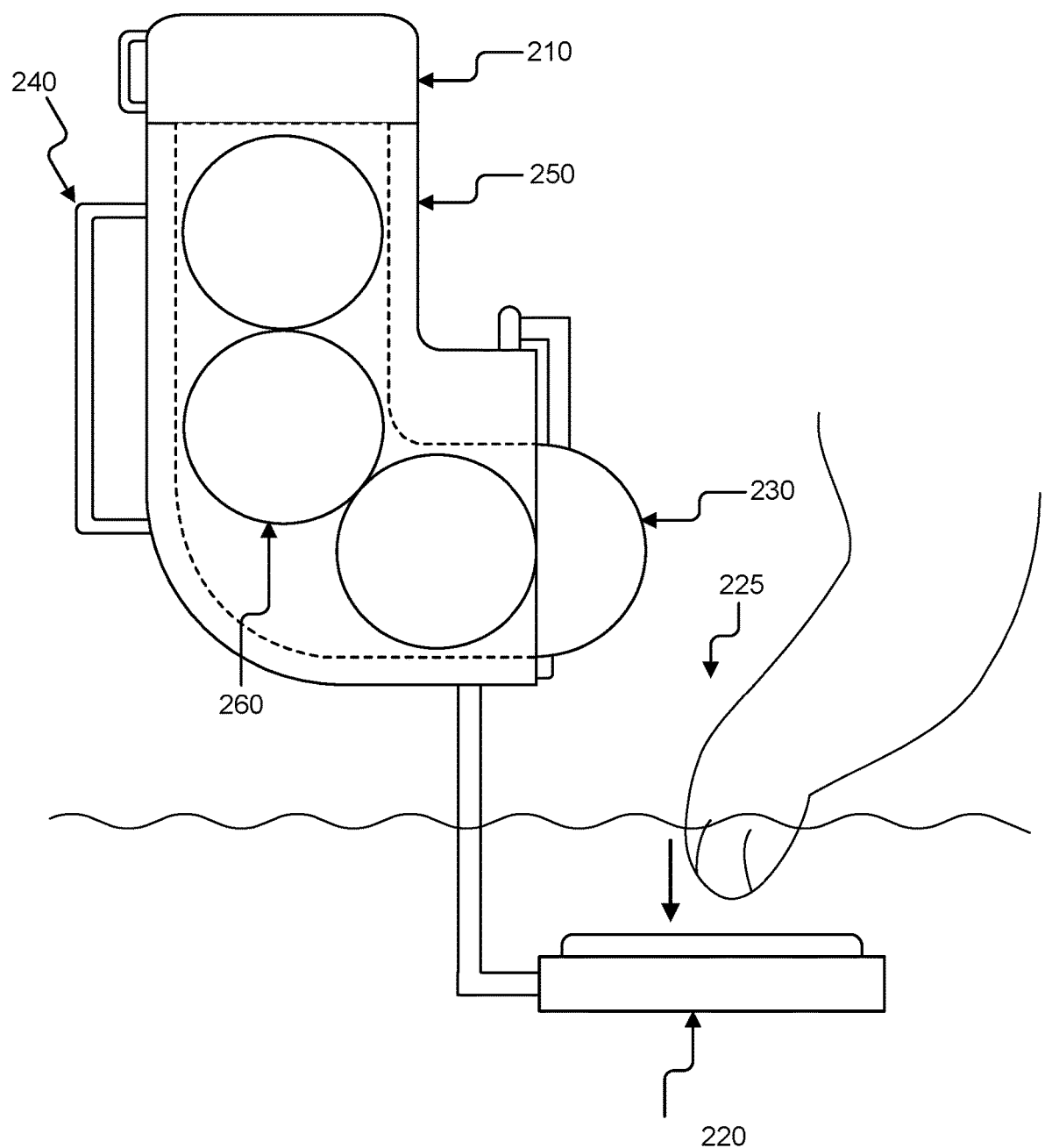
FIG. 2A illustrates an exemplary enrichment device comprising a detached release mechanism, according to some embodiments of the present disclosure.
Figure 2B:
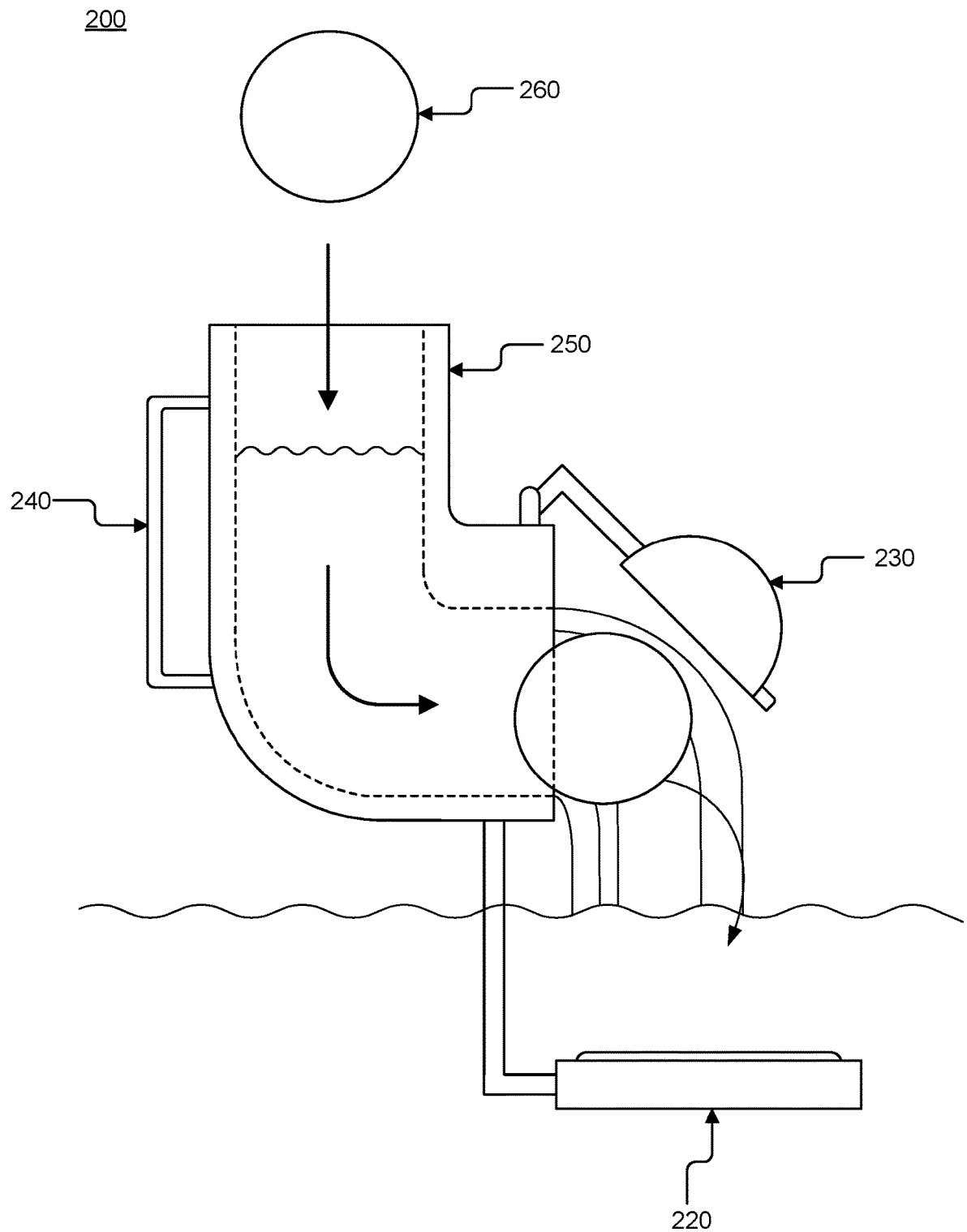
FIG. 2B illustrates an exemplary enrichment device comprising a detached release mechanism, according to some embodiments of the present disclosure.

Referring now to FIGS. 2A-2B, an exemplary enrichment device 200 comprising a detached release mechanism 220 is illustrated. In some embodiments, the enrichment device 200 may comprise a cap 210. In some implementations, the enrichment device 200 may comprise a body 250. In some aspects, the enrichment device 200 may comprise a release mechanism 220. In some implementations, the release mechanism may exist as a component separated from the body 250. In some aspects, the release mechanism 220 may be activated by a user 225.

For example, the user may be a pet 225 who may depress the release mechanism 220 with its paw. In some implementations, the body 250 may comprise balls 260 as recreational entertainment for the pet. This may be applicable in pet parks for public use or for the dog's personal entertainment within the backyard, as non-limiting options. In some embodiments, the enrichment device 200 may be attached to the side of kiddy pool the dog plays in. In some implementations, the release mechanism 220 may be separate and placed under the water, where depression by a paw of the user 225 may release a ball 260 into the kiddy pool for the pet.

In some implementations, the enrichment device may assist in learned behavior development. For example, a dog may navigate a practice obstacle course and an enrichment device 200 may be present at the end of the course. The ball 260 of the enrichment device 200 may comprise an edible reward for the dog's effort that is released upon depression of the release mechanism 220.

In some embodiments, the enrichment device 200 may comprise one or more balls 260. In some implementations, the enrichment device 200 may comprise an attachment mechanism 240. In some aspects, the enrichment device 200 may comprise a retaining mechanism 230. In some embodiments, the release mechanism 220 may open the retaining mechanism 230 by pneumatic pressure. In some implementations, the release mechanism 220 may be depressed one or more times to build sufficient pressure within the pneumatic system to open the retaining mechanism 230. In some aspects, pneumatic pressure may be used to keep the release mechanism 220 in place. In some embodiments, pneumatic pressure may retain the shape of the enrichment device 200. In some implementations, a user may restore the enrichment devices' shape by pumping air into a receiver with a compressor.

Figure 3B:
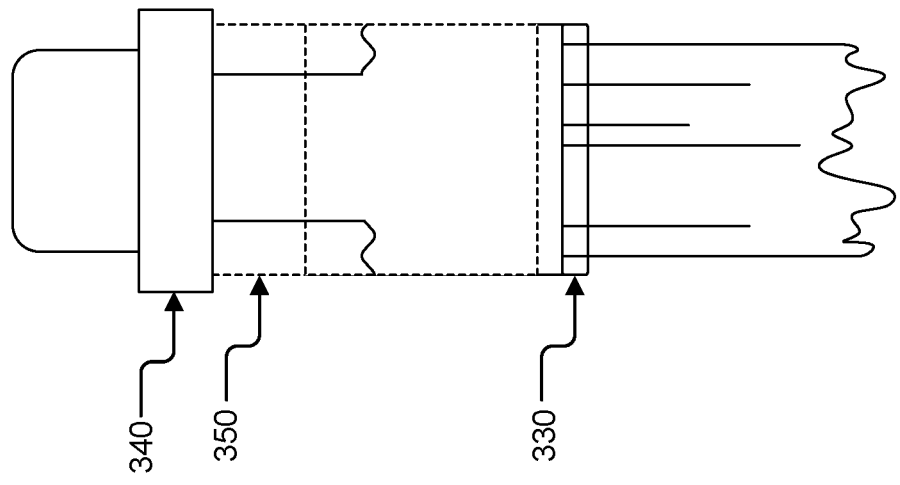
FIG. 3B illustrates a front view of an exemplary enrichment device comprising a passive release mechanism, according to some embodiments of the present disclosure.
Figure 3A:
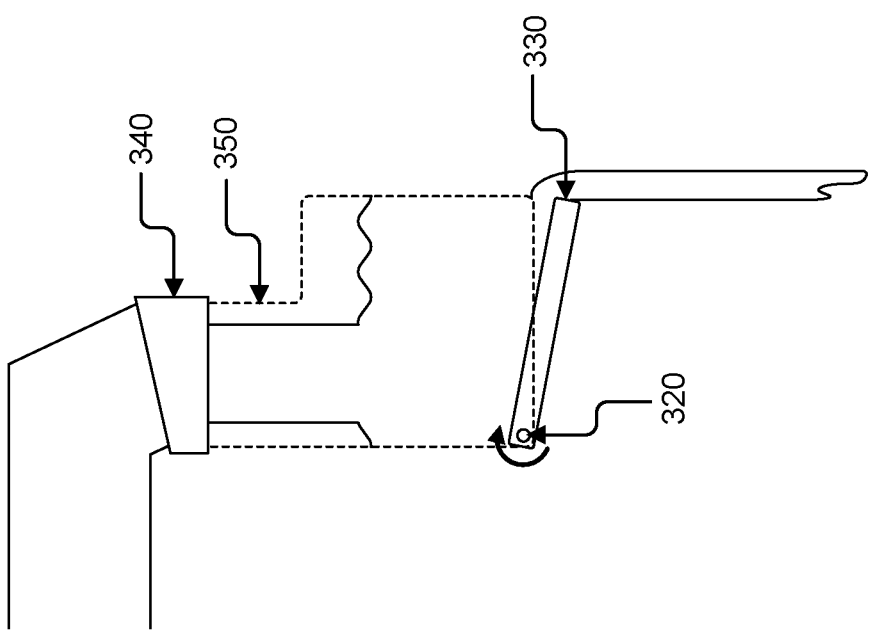
FIG. 3A illustrates an exemplary enrichment device comprising a passive release mechanism, according to some embodiments of the present disclosure.

Referring now to FIGS. 3A-3B, an exemplary enrichment device 300 comprising a passive release mechanism 320 is illustrated. In some implementations, the enrichment device 300 may comprise a body 350. In some embodiments, the body 350 may be filled by a continuous flow of fluid. In some aspects, the enrichment device 300 may comprise a passive release mechanism 320. In some embodiments, the release mechanism may utilize a retention force that may be overcome with an applied force of sufficient magnitude.

As an illustrative example, the enrichment device 300 may attach to the water facet 340 of a bathtub. The tub facet may fill the body 350 of the enrichment device 300 at a predetermined rate. As the volume of water within the enrichment device 300 increases, the retention force of the torsional spring 320 retaining the water may be overcome. As the release mechanism 320 allows the base 330 of the enrichment device to open, the water may pour slowly out of the horizontal slit formed at the base 330 of the enrichment device.

The water may continue to pour until the force of the weight of the water becomes less than the torsional force of the release mechanism 320 and the base 330 of the enrichment device 300 closes again and allows the body 350 to fill again with water. This may occur in a cyclical process that may provide relaxation for adult users. The water may also maintain a constant temperature within a bath during use.

In some implementations, the enrichment device 300 may comprise an attachment mechanism 340. In some embodiments, the attachment mechanism may comprise suction cups, magnets, clamps, extended loops of material that may be tightened around the intended attached fixture, as a non-limiting list.

In some aspects, the enrichment device 300 may comprise a retaining mechanism 330. In some embodiments, the retaining mechanism 330 may provide an adjustable opening from the body 350. In some implementations, the retaining mechanism 330 may open to the minimal amount sufficient to allow the release of the contents within the body 350.

Figure 4B:
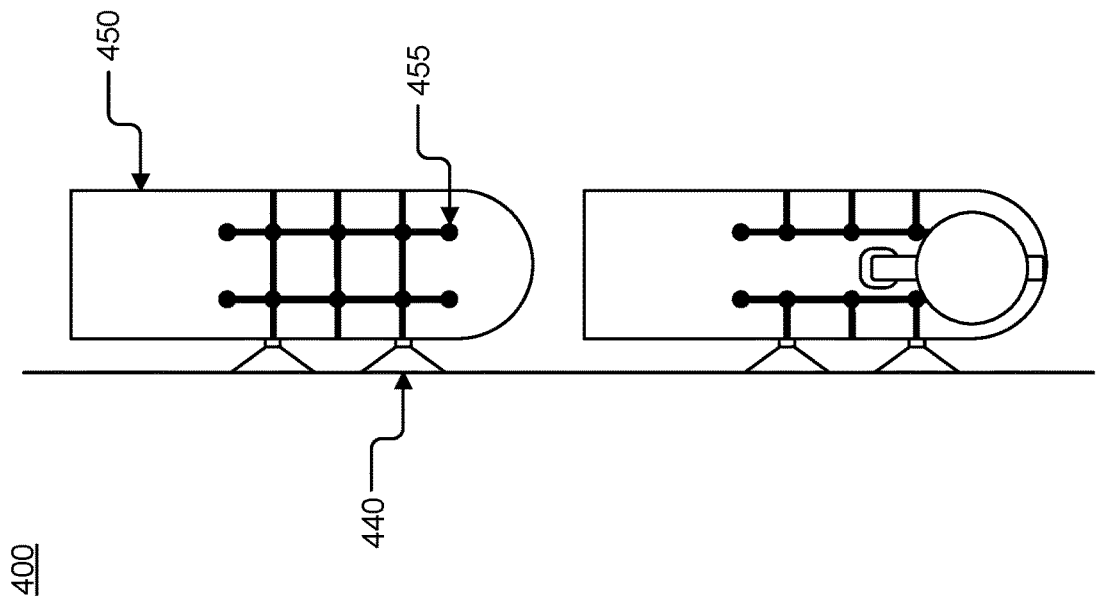
FIG. 4B illustrates a rear view of a plurality of exemplary enrichment devices comprising tracks, according to some embodiments of the present disclosure.
Figure 4A:
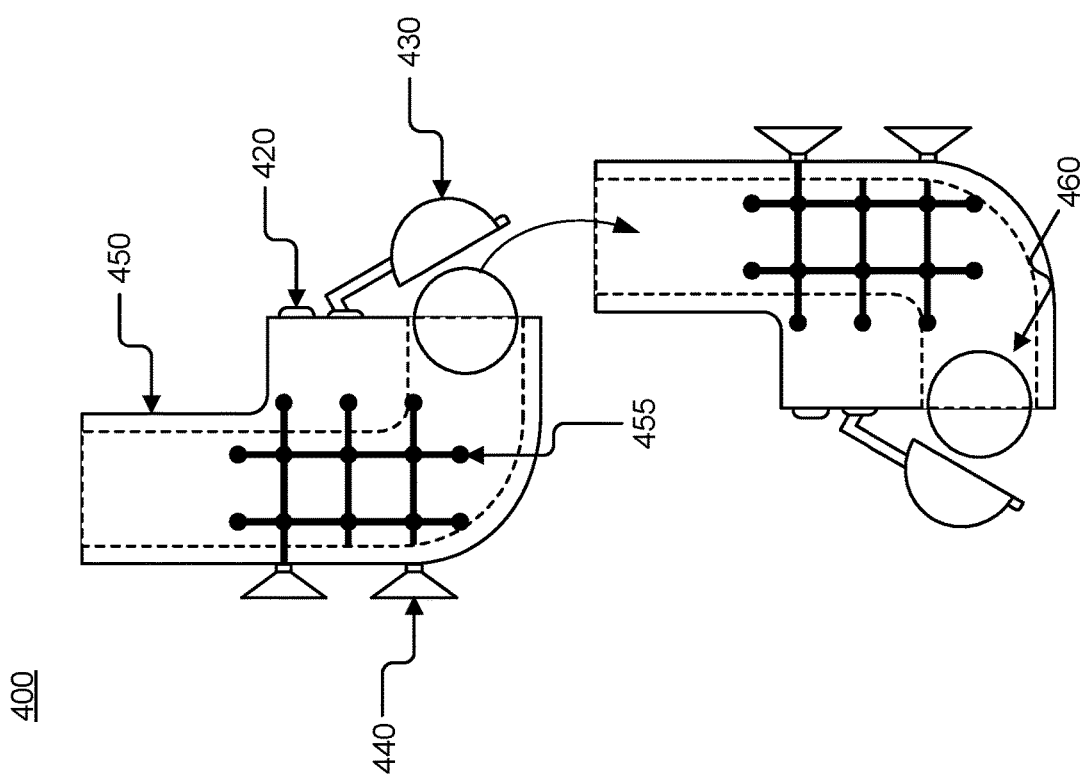
FIG. 4A illustrates a side view of an exemplary enrichment device comprising tracks, according to some embodiments of the present disclosure.

Referring now to FIGS. 4A-4B an exemplary enrichment device 400 comprising tracks 455 is illustrated. In some embodiments, the enrichment device 400 may comprise a cap 410. In some implementations, the enrichment device 400 may comprise a body 450. In some aspects, the enrichment device 400 may comprise a release mechanism 420.

In some implementations, the enrichment device 400 may comprise an attachment mechanism 440. In some embodiments, the enrichment device 400 may comprise one or more tracks 455 to facilitate interchangeable orientations for the attachment mechanism 440. This may allow a plurality of orientations for the use of the enrichment device 400. In some implementations, this may allow a plurality of enrichment devices 400 to interact with one another.

As an illustrative example, four enrichment devices 400 may be aligned to work together on the wall of a bathtub. One enrichment device 400 may be placed in a horizontal orientation above the other enrichment devices 400. The ball 460 may be inserted through the traditional exit and may exit out of the opening in the top of the enrichment device 400. As a ball is released from the retaining mechanism 430, the ball 460 may fall into the top of a vertically aligned enrichment device 400.

The ball 460 may exit the second enrichment device 400 and enter directly into a horizontally oriented enrichment device 400 that has a downward-facing opening. The ball 460 may fall from the exit of the enrichment device 400 into a vertically-aligned enrichment device that, upon depressing the release mechanism 420, may allow the ball 460 to pour from the enrichment device 400 into the bathtub.

Figure 5:
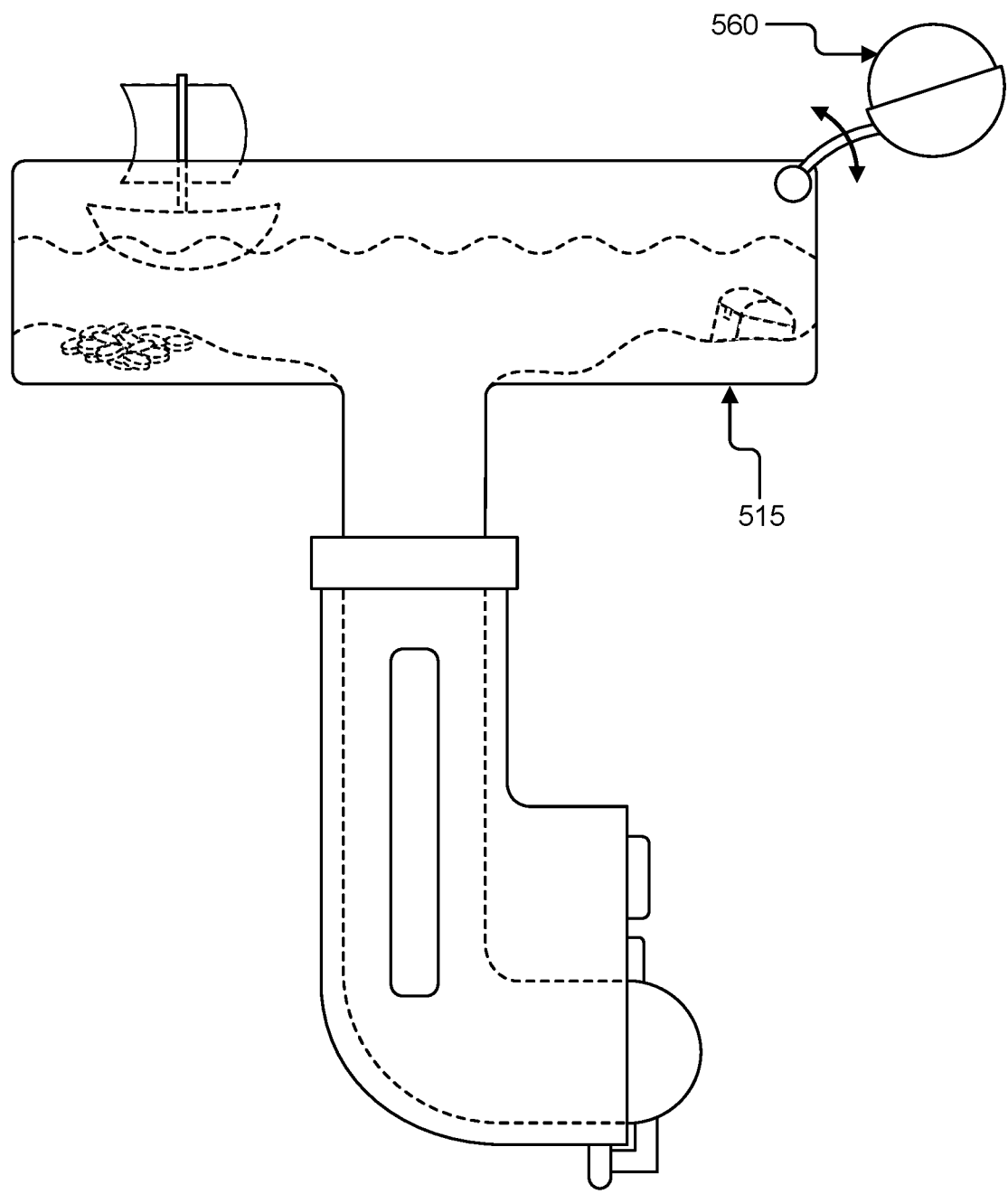
FIG. 5 illustrates an exemplary enrichment device comprising an interchangeable cap, according to some embodiments of the present disclosure.

Referring now to FIG. 5, an exemplary enrichment device 500 comprising an interchangeable cap 515 is illustrated. In some embodiments, the interchangeable cap 515 may extend out in different directions from the enrichment device 500. In some aspects, objects may be placed inside the top of the interchangeable cap 515 and travel through the enrichment device 500. In some implementations, the interchangeable cap 515 may be attached to the enrichment device 500 differently than previously mentioned. In some aspects, the interchangeable cap 515 may comprise support trusses that keep the structure from collapsing. For example, the interchangeable cap 515 may have a truss connected from the base to the bottom of either side.

In some embodiments, the interchangeable cap 515 may have a cover over the top that keeps liquid and other objects from falling out. In some aspects, the cover may rotate open and closed so that objects may be placed inside the interchangeable cap 515. In some aspects, the cover may comprise an opening somewhere on the cover that allows objects to be placed inside. In some implementations, the interchangeable cap 515 may have a lining on the outside where it meets the inside of the enrichment device 500 to keep liquid sealed inside. In some aspects, the interchangeable cap 515 may be made up of a different material than that of the enrichment device 500.

As an illustrative example, the interchangeable cap 515 may comprise an underwater scene, such as for a pirate ship. The interchangeable cap 515 may be inserted into the receiving opening, and a ball 560 placed into the interchangeable cap 515 may roll into the receiving opening. In some embodiments, the interchangeable cap 515 may comprise a launching mechanism that allows a user to launch a ball 560 into the interchangeable cap 515.

Figure 6B:
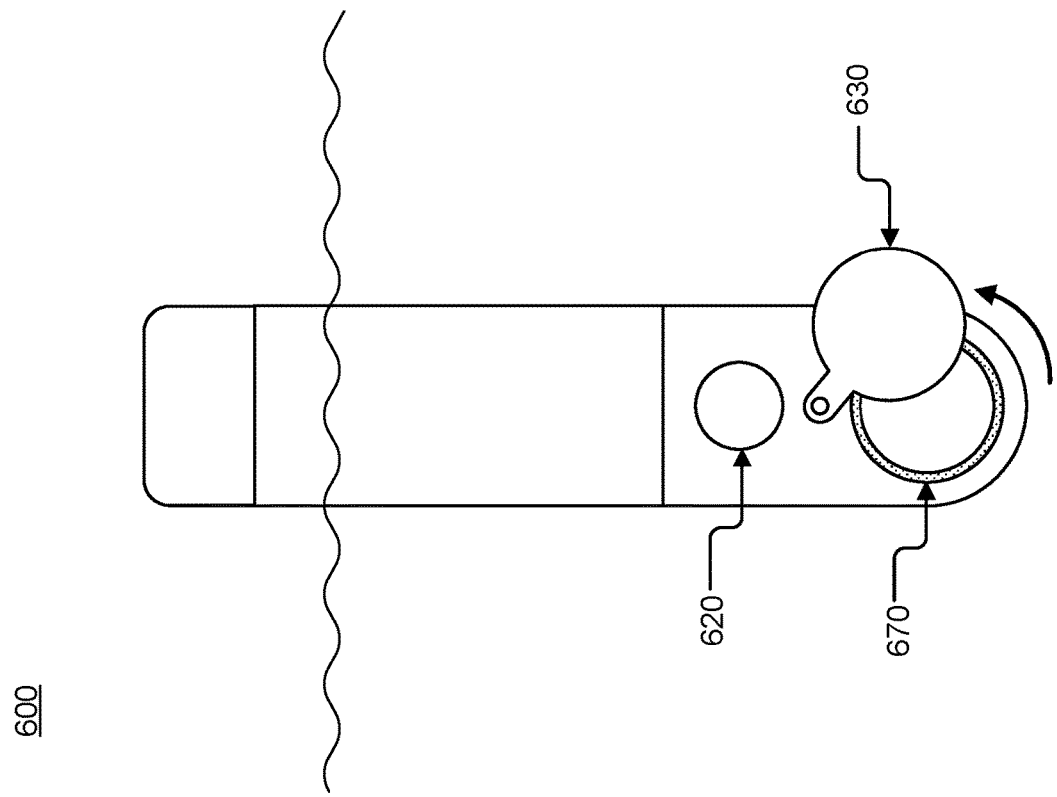
FIG. 6B illustrates an exemplary retaining mechanism, according to some embodiments of the present disclosure.
Figure 6A:
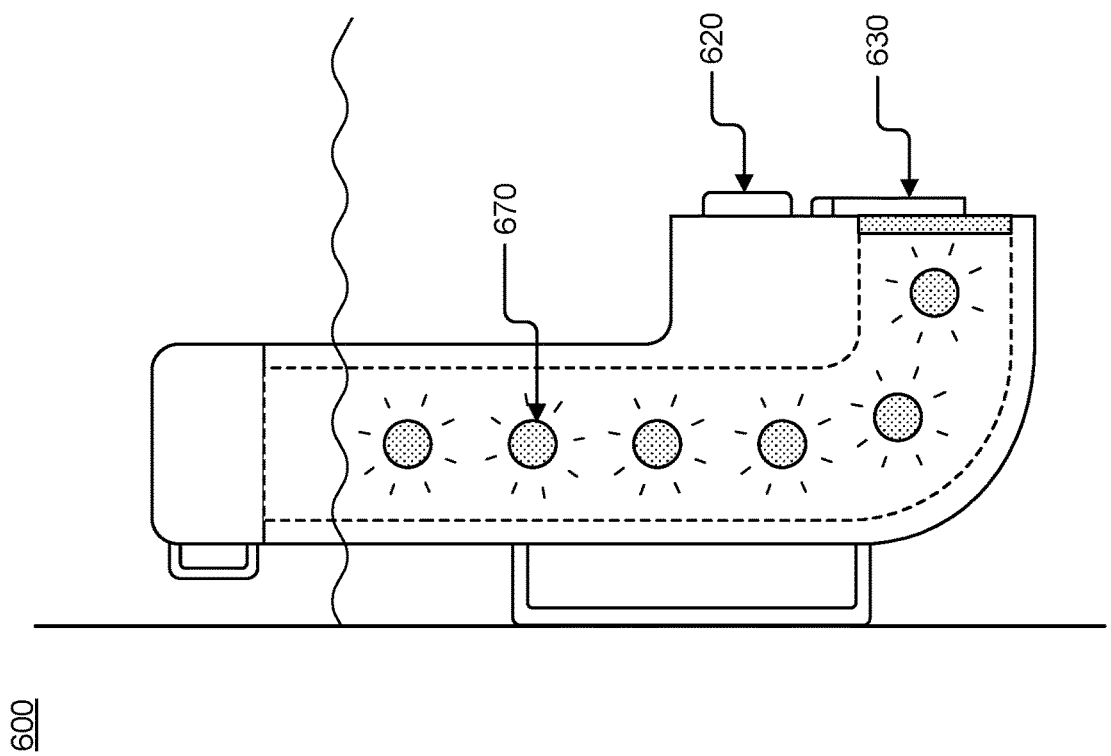
FIG. 6A illustrates an exemplary enrichment device comprising one or more sensory devices, according to some embodiments of the present disclosure.

Referring now to FIG. 6A, an exemplary enrichment device 600 comprising one or more sensory devices 670 is illustrated. In some aspects, the sensory device 670 may be waterproof. In some aspects, the sensory device 670 may comprise lights that change color. In some embodiments, the lights may change color in a predefined time cycle, based on user input, or based on predefined actions, as non-limiting examples. In some implementations, the sensory device 670 lights may change when physically contacted. In some embodiments, the sensory device 670 lights may remain one color. In some aspects, the sensory device 670 lights may be controlled by a remote control.

In some implementations, the sensory device 670 may provide haptic feedback or vibrate the enrichment device 600. In some aspects, the vibration may occur when a user interfaces with the enrichment device 600. In some implementations, the sensory device 670 may be auditory that emit sounds when motion is detected, generally or from within the cavity. In some embodiments, the audio may be pre-recorded before inserted into the enrichment device 600. In some aspects, the audio may be changed in the sensory device 670 at any time. In some aspects, the sensory device 670 may omit images onto the enrichment device 600 using some form of light.

Referring now to FIG. 6B, an exemplary retaining mechanism 630 is illustrated. In some aspects, the retaining mechanism 630 may comprise a joint that allows for it to rotate counter clockwise or clockwise, or both. For example, a user may rotate the retaining mechanism 630 counter-clockwise to release the object inside the enrichment mechanism 600, and then release the retaining mechanism clockwise to close it. In some aspects, the retaining mechanism 630 may detect motion when an object is within range. In some implementations, the retaining mechanism 630 may have an automated joint that rotates without the aid of a user.

In some implementations, the retaining mechanism 630 may have lining on either side that protects the enrichment device 600 from scratches and other possible damage. In some aspects, a release mechanism 620 may be pressed to open and close the retaining mechanism 630. In some embodiments, the button may only be pressed once and a timer may start to open and close the retaining mechanism 630.

Figure 7B:
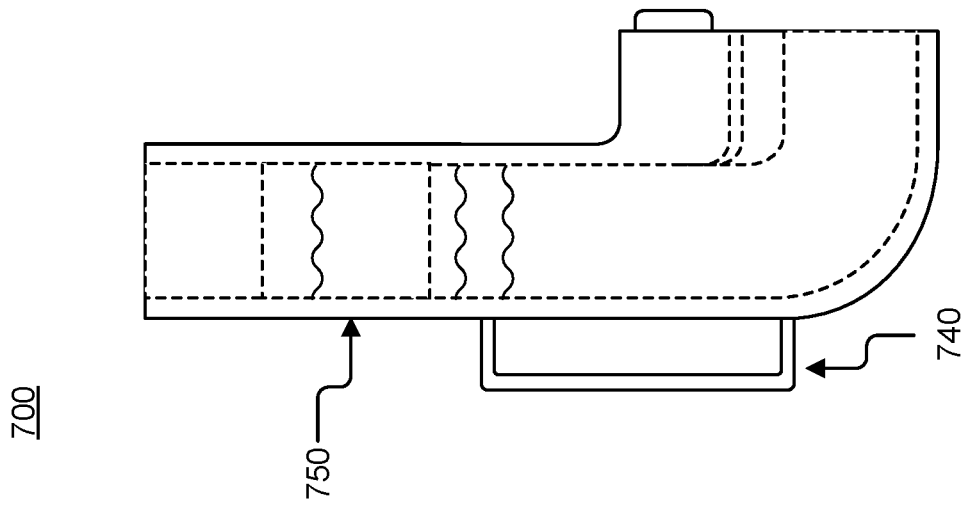
FIG. 7B illustrates a side view of an exemplary enrichment device comprising a plurality of enrichment devices, according to some embodiments of the present disclosure.
Figure 7A:
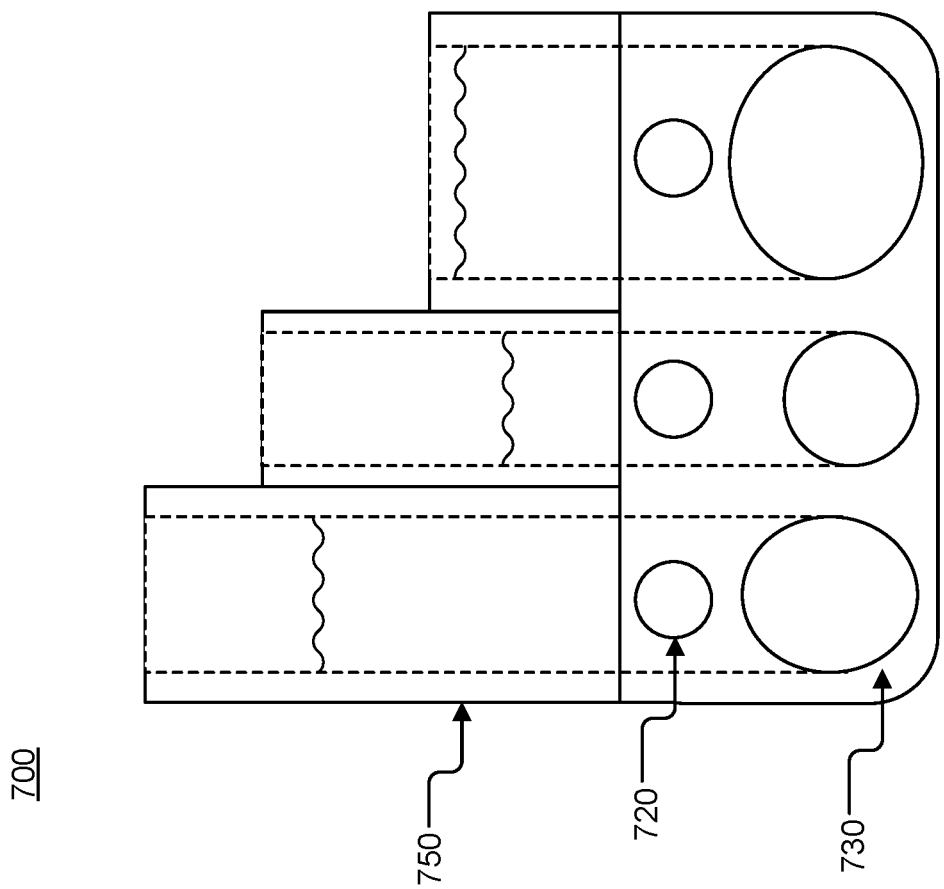
FIG. 7A illustrates an exemplary enrichment device comprising a plurality of enrichment devices, according to some embodiments of the present disclosure.

Referring now to FIG. 7A, an exemplary enrichment device 700 comprising a plurality of bodies 750 is illustrated. In some aspects, more than one opening may be used on the enrichment device 700. In some embodiments, the openings may vary in size and diameter. In some aspects, the different openings may come with different sized balls that fit through each cavity of the enrichment device 700. In some implementations, the lengths of the cavities on the openings may differ. For example, the length of the cavity on the largest opening may be the shortest, and the smallest opening may be the longest. Varying sizes and lengths of cavities may allow a user to learn about and understand general scientific principles, such as related to gravity.

In some implementations, fluid poured into an enrichment device 700 may flow from receiving opening to exit opening. In some aspects, each opening may have its own cap and retaining mechanism 730. In some embodiments, the different cavities, and openings of the enrichment device 700 may be detachable or interchangeable. For example, one of the cavities may be taken off the left-hand side of the enrichment device 700 and placed on to the right side. In some implementations, each opening may have its own release mechanism 730 that individually opens each opening. In some aspects, there may be a singular release mechanism 730 that may release all of the openings.

Referring now to FIG. 7B, a side view of an exemplary enrichment device 700 comprising a plurality of bodies 750 is illustrated. In some implementations, the cavity in the enrichment device 700 may be set to different levels. For example, a mechanism may be placed inside the cavity of the enrichment device 700 that prevents the liquid from going higher or lower. In some embodiments, the enrichment device 700 may have an attachment mechanism 740 on its rear that secures it to a surface. In some aspects, the attachment mechanism 740 may comprise suction cups or adhesive material that adhere the enrichment device 700 to a surface as a non-limiting example. In some embodiments, the attachment mechanism 740 may be removable from the enrichment device 700. For example, if a user wishes to clean the attachment mechanism 740, they may remove it entirely from the enrichment device 700 and then replace it at any time.

Figure 8A:
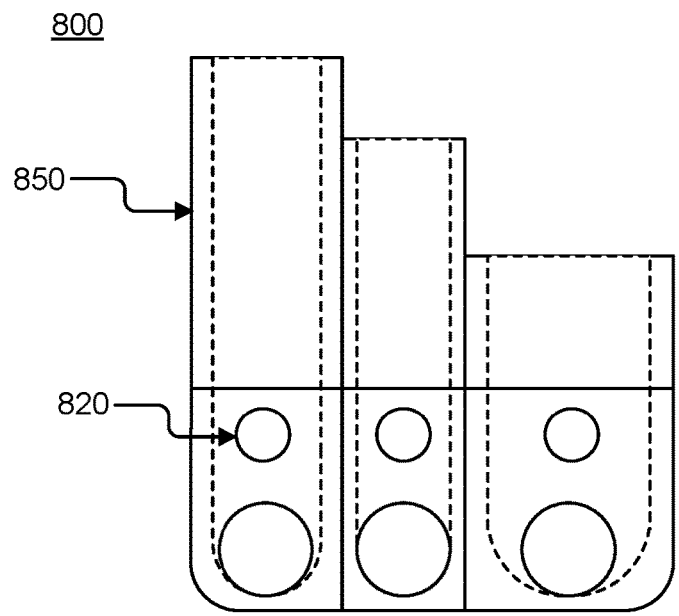
FIG. 8A illustrates an exemplary enrichment device comprising a plurality of enrichment devices with interchangeable caps, according to some embodiments of the present disclosure.
Figure 8B:
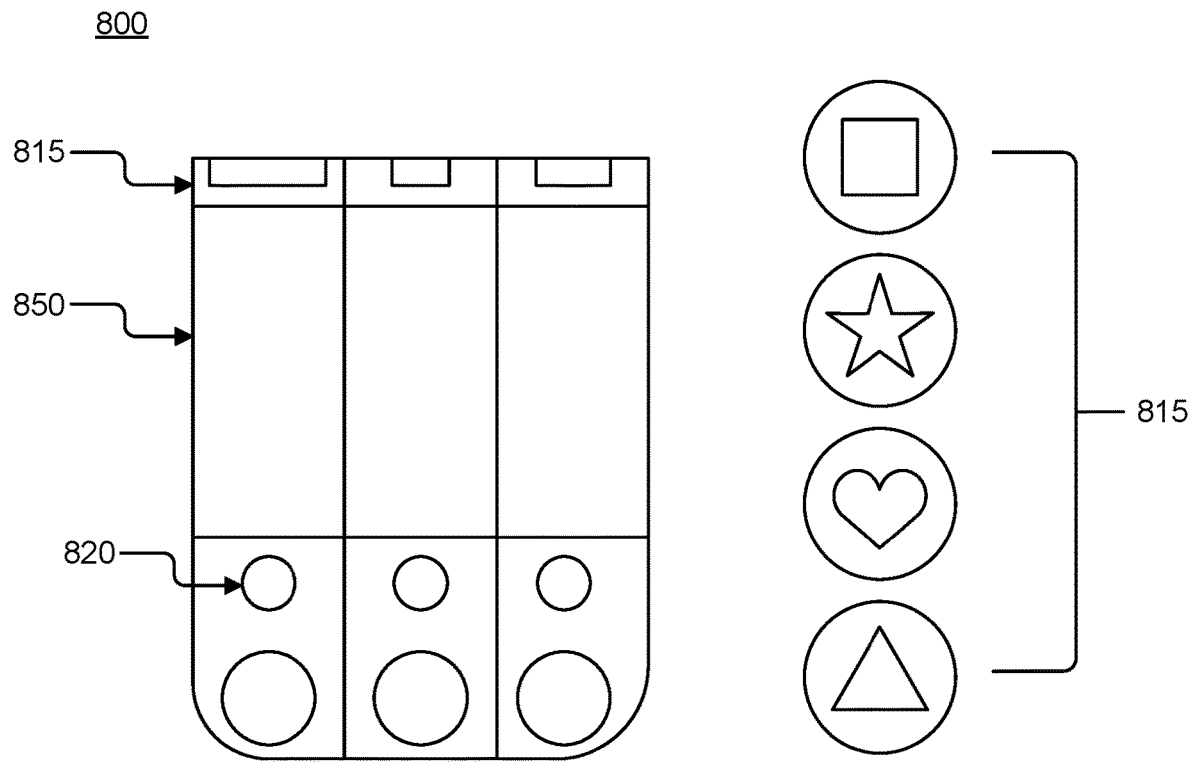
FIG. 8B illustrates an exemplary enrichment device comprising a plurality of enrichment devices with interchangeable caps, according to some embodiments of the present disclosure.

Referring now to FIGS. 8A-8B, an exemplary enrichment device 800 comprising a plurality of receiving openings, exit openings, and cavities with interchangeable caps 815 is illustrated. In some aspects, the interchangeable cap 815 may vary in diameter and depth. In some embodiments, the depth of the interchangeable cap 815 may prevent extra liquid from being added inside the enrichment device 800. In some implementations, the interchangeable caps 815 may comprise a second receiving opening that may connect to the receiving opening of the body 850.

In some aspects, the interchangeable caps 815 may snap onto the top of the enrichment device 800. In some implementations, the interchangeable caps 815 may have unique designs on the top to signify their spot on the enrichment device 800. In some embodiments, the cavity of the enrichment device 800 may be a unique shape and the cap may be the same to fit on a specific cavity. For example, one cavity may be in the shape of a star and a corresponding interchangeable cap 815 may fit into the star as a non-limiting example. In some aspects, the balls may comprise corresponding shapes. For example, the ball may comprise a triangular shape that may be inserted into a triangular receiving opening.

In some implementations, the release mechanism 820 may be pressed and the interchangeable cap 815 may release. For example, an interchangeable cap 815 may be locked into place on the enrichment device 800 and if the release mechanism 820 is pressed then the interchangeable cap 815 may be released. In some aspects, the interchangeable cap 815 may be airtight and prevent other matter from entering the cavity of the enrichment device 800. In some embodiments, the interchangeable cap 815 may be stored inside the cavity of the enrichment device 800 when not in use.

In some implementations, the interchangeable cap 815 may have a button on the top the locks and releases it from the enrichment device 800. For example, a user may press the button and the interchangeable cap 815 may be unlocked from the cavity of the enrichment device 800. In some embodiments, the buttons on the top of the interchangeable cap 815 may change color when pressed. In some aspects, the interchangeable cap 815 may light up and rotate colors.

Figure 9A:
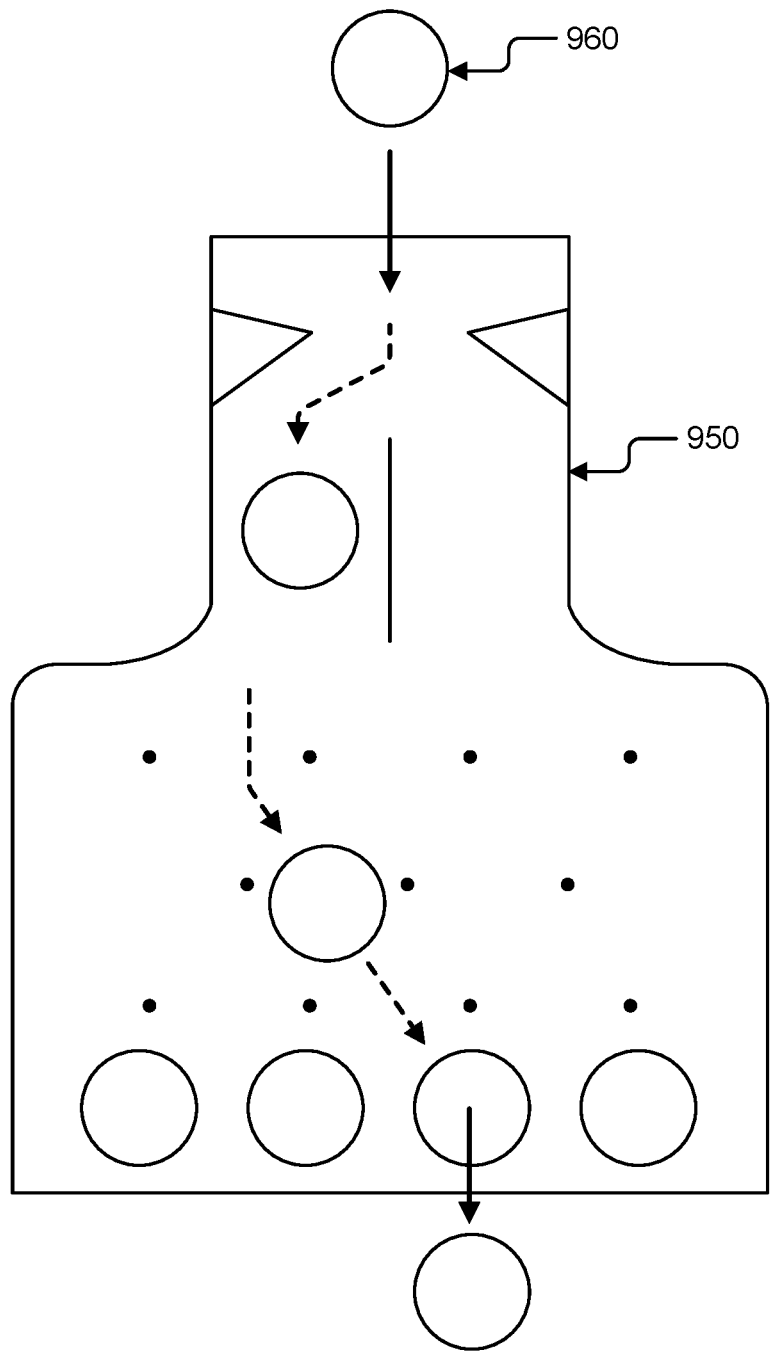
FIG. 9A illustrates an exemplary enrichment device comprising a plurality of retaining mechanisms, according to some embodiments of the present disclosure.
Figure 9B:
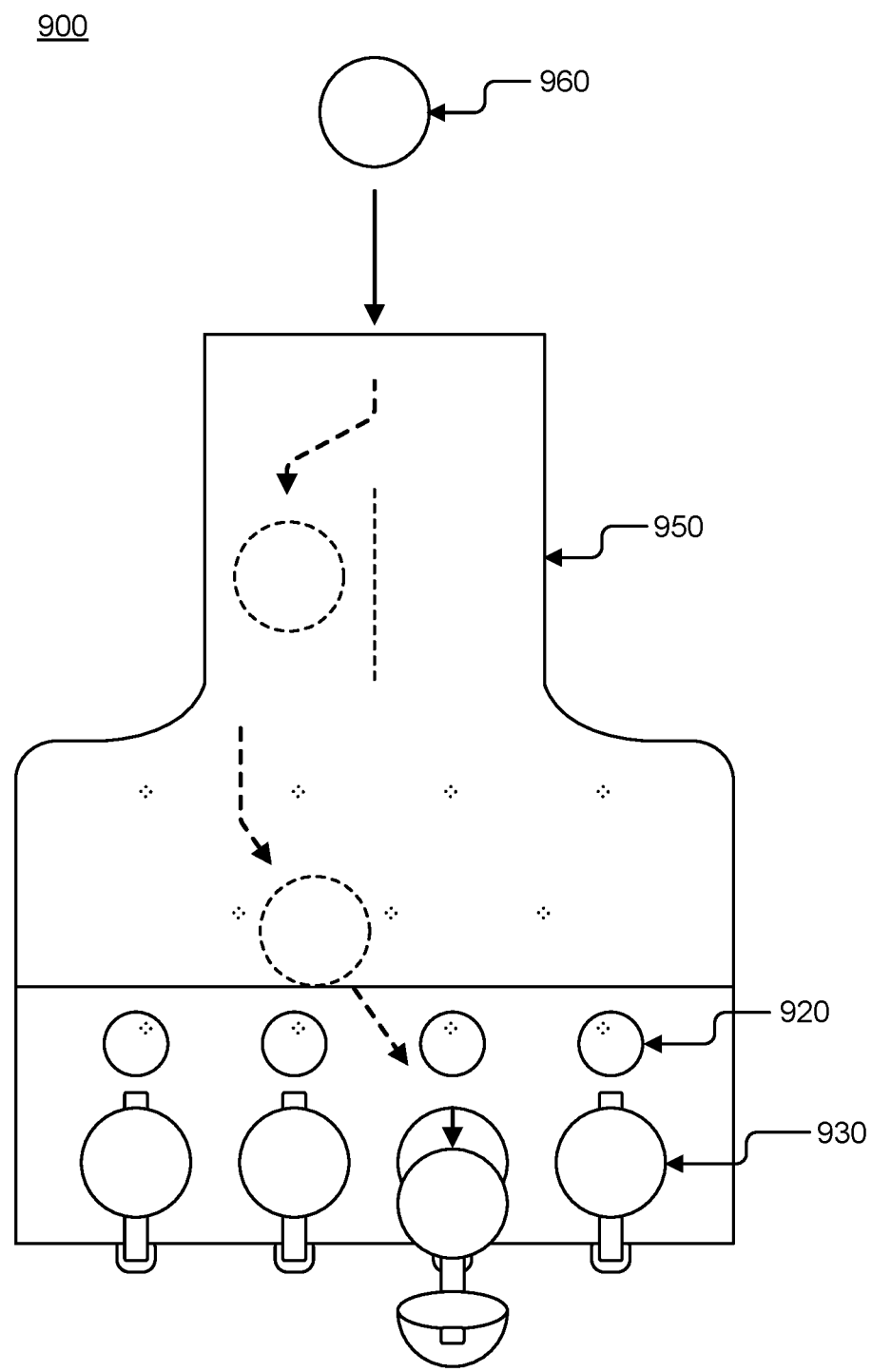
FIG. 9B illustrates an exemplary enrichment device comprising a plurality of retaining mechanisms, according to some embodiments of the present disclosure.

Referring now to FIG. 9A, a cross-section of an exemplary enrichment device 900 comprising a plurality of retaining mechanisms 930 is illustrated. Referring now to FIG. 9B, an exemplary front view of an exemplary enrichment device 900 is illustrated. In some embodiments, the enrichment device 900 may have rods on the interior that deflect the ball 960 into different directions. In some aspects, the ball 860 may be deflected into different exit openings along the bottom of the enrichment device 900.

In some implementations, at least a portion of the enrichment device 900 may be transparent so that a user may see the ball 960 bounce around inside. In some aspects, the rods on the interior of the enrichment device 900 may change color when physically contacted. In some embodiments, a receiving opening may be large enough to allow for multiple trajectories through the cavity.

In some aspects, the front of the enrichment device 900 may be removed so that the rods may be removed and repositioned. For example, the rods may be switched around to create different paths for the ball 960 inside the enrichment device 900. In some embodiments, the enrichment device 900 may comprise knobs at the top of the cavities so that the ball 960 is guided right or left. In some aspects, a knob may exist on either side of the top end of the enrichment device 900. In some implementations, different objects may be placed into the enrichment device 900 and deflect down to the bottom.

CONCLUSION

A number of embodiments of the present disclosure have been described. While this specification contains many specific implementation details, these should not be construed as limitations on the scope of any disclosures or of what may be claimed, but rather as descriptions of features specific to particular embodiments of the present disclosure.

Certain features that are described in this specification in the context of separate embodiments can also be implemented in combination or in a single embodiment. Conversely, various features that are described in the context of a single embodiment can also be implemented in combination in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous.

Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order show, or sequential order, to achieve desirable results. In certain implementations, multitasking and parallel processing may be advantageous. Nevertheless, it will be understood that various modifications may be made without departing from the spirit and scope of the claimed disclosure.

What is claimed is:

1. An enrichment device comprising:
a body comprising:
a receiving opening,
an exit opening, wherein the receiving opening is configured to receive an inserted ball and the exit opening is configured to dispense the inserted ball, and
a body cavity connecting the receiving opening and the exit opening, wherein the inserted ball travels from the receiving opening to the exit opening through the body cavity;
a retaining mechanism configured to fit over at least a portion of the exit opening, wherein the retaining mechanism is securable through a magnetic mechanism;
a release mechanism configured to control a position of the retaining mechanism, wherein pressing the release mechanism releases the magnetic mechanism; and
an attachment mechanism configured to attach the body to a wall or fixture, wherein the attachment mechanism further comprises a plurality of suction cups.

2. The enrichment device of claim 1, further comprising at least a first cap attachable to the receiving opening.

3. The enrichment device of claim 2, wherein the cap comprises a cup with handle.

4. The enrichment device of claim 2, wherein the cap comprises a secondary receiving opening, wherein the inserted ball travels through the secondary receiving opening into the receiving opening.

5. The enrichment device of claim 1, wherein the release mechanism is rotatable.

6. The enrichment device of claim 1, wherein the attachment mechanism is adjustable.

7. The enrichment device of claim 6, further comprising an attachment mechanism track located on the body, wherein the attachment mechanism is configured to slide along the attachment mechanism track.

8. The enrichment device of claim 1, wherein the body comprises at least one sensory device.

9. The enrichment device of claim 8, wherein the at least one sensory device comprises motion-activated lights, wherein motion-activated lights activate as an inserted ball travels through the body cavity.

10. The enrichment device of claim 8, wherein the at least one sensory device comprises haptic feedback configured to activate as an inserted ball travels through the body cavity.

11. An enrichment device comprising:
a plurality of bodies, each comprising:
a receiving opening,
an exit opening, wherein the receiving opening is configured to receive an inserted ball and the exit opening is configured to dispense the inserted ball,
a body cavity connecting the receiving opening and the exit opening, wherein the ball travels from the receiving opening to the exit opening through the body cavity;
at least one retaining mechanism configured to fit over at least a portion of at least one exit opening, wherein the at least one retaining mechanism is securable through a magnetic mechanism;
at least one release mechanism configured to control a position of the at least one retaining mechanism, wherein pressing the at least one release mechanism releases the magnetic mechanism; and
at least one attachment mechanism configured to attach the plurality of bodies to a wall or fixture, wherein the at least one attachment mechanism further comprises a plurality of suction cups.

12. The enrichment device of claim 11, wherein the plurality of bodies are connected.

13. The enrichment device of claim 12, wherein the body cavity of each of the plurality of bodies is parallel.

14. The enrichment device of claim 11, wherein the plurality of bodies are connectable.

15. The enrichment device of claim 11, further comprising a plurality of caps, wherein each cap covers each receiving opening.

16. An enrichment device comprising:
a body comprising
a body comprising
a first receiving opening,
a plurality of exit openings, wherein the first receiving opening is configured to accept an inserted ball and the plurality of exit openings are configured to dispense the inserted ball, and
a body cavity connecting the first receiving opening and the plurality of exit openings, wherein the inserted ball travels from the receiving opening to the exit opening through the body cavity;
a retaining mechanism configured to fit over at least a portion of the plurality of exit openings, wherein the retaining mechanism is securable through a magnetic mechanism;
a release mechanism configured to control a position of the retaining mechanism, wherein the position of the retaining mechanism controls dispensing of the inserted ball, and wherein pressing the release mechanism releases the magnetic mechanism; and
an attachment mechanism attachable to the body, wherein the attachment mechanism is configured to attach the body to a wall or fixture, and wherein the attachment mechanism further comprises a plurality of suction cups.

17. The enrichment device of claim 16, further comprising a cap attachable to the first receiving opening, wherein the cap covers at least a portion of the first receiving opening when in a closed position.

18. The enrichment device of claim 16, wherein the body cavity provides a plurality of paths from the first receiving opening to the plurality of exit openings.

* * * * *